US011347558B2

(12) United States Patent
Crossley et al.

(10) Patent No.: US 11,347,558 B2
(45) Date of Patent: May 31, 2022

(54) SECURITY-AWARE SCHEDULING OF VIRTUAL MACHINES IN A MULTI-TENANT INFRASTRUCTURE

(71) Applicant: Nutanix, Inc., San Jose, CA (US)

(72) Inventors: Malcolm Gordon Crossley, Santa Clara, CA (US); Miao Cui, New York, NY (US); Fabien Hermenier, Grasse (FR); Aditya Ramesh, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 122 days.

(21) Appl. No.: 16/777,237

(22) Filed: Jan. 30, 2020

(65) Prior Publication Data

US 2021/0173710 A1    Jun. 10, 2021

Related U.S. Application Data

(60) Provisional application No. 62/945,686, filed on Dec. 9, 2019.

(51) Int. Cl.
*G06F 9/50* (2006.01)
*G06F 9/455* (2018.01)

(52) U.S. Cl.
CPC .......... *G06F 9/505* (2013.01); *G06F 9/45558* (2013.01); *G06F 2009/45587* (2013.01)

(58) Field of Classification Search
CPC ................ G06F 9/505; G06F 9/45558; G06F 2009/45587; G06F 9/5077
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,274,851 B2 | 3/2016 | Cheung et al. |
| 9,372,705 B2 | 6/2016 | Cropper et al. |
| 9,772,866 B1 | 9/2017 | Aron et al. |

(Continued)

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Javier O Guzman
(74) *Attorney, Agent, or Firm* — Vista IP Law Group, LLP

(57) ABSTRACT

Methods, systems and computer program products for computer cluster management. Multiple components are operatively interconnected to carry out operations for placing virtual machines onto a multi-tenant computing cluster, where the placement achieves adherence to a set of security requirements. Initially, data characterizing logical CPU resources of the multi-tenant computing cluster are gathered. Upon receipt of a request to place a virtual machine onto a node of the multi-tenant computing cluster, a set of security rules that are used to achieve the set of security requirements associated with the multi-tenant computing cluster are accessed. In accordance with the security rules the virtual machine is assigned to execute in a portion of the logical CPU resources. The virtual machine does not share logical CPU resources with any other tenant.

30 Claims, 11 Drawing Sheets

(56) References Cited

U.S. PATENT DOCUMENTS

| | | | | |
|---|---|---|---|---|
| 9,898,347 | B1* | 2/2018 | Gupta | H04L 67/1004 |
| 10,394,475 | B2* | 8/2019 | Li | G06F 3/067 |
| 10,782,990 | B1* | 9/2020 | Suarez | G06F 9/5005 |
| 11,036,560 | B1* | 6/2021 | Mcpherson | G06F 16/254 |
| 2003/0217088 | A1* | 11/2003 | Takamoto | G06F 11/2025 718/1 |
| 2008/0276246 | A1* | 11/2008 | Armstrong | G06F 9/4843 718/104 |
| 2009/0077550 | A1* | 3/2009 | Rhine | G06F 9/45558 718/1 |
| 2009/0150896 | A1* | 6/2009 | Tsushima | G06F 9/45558 718/104 |
| 2011/0296406 | A1* | 12/2011 | Bhandari | G06F 9/5044 718/1 |
| 2011/0302579 | A1* | 12/2011 | Shinohara | G06F 9/5083 718/1 |
| 2013/0198755 | A1* | 8/2013 | Kim | G06F 9/505 718/104 |
| 2013/0263120 | A1* | 10/2013 | Patil | G06F 9/45558 718/1 |
| 2014/0149980 | A1* | 5/2014 | Vittal | G06F 11/3006 718/1 |
| 2014/0164624 | A1 | 6/2014 | Ames et al. | |
| 2015/0058861 | A1 | 2/2015 | Zheng et al. | |
| 2016/0380905 | A1* | 12/2016 | Wang | G06F 9/5077 709/226 |
| 2017/0220365 | A1* | 8/2017 | Dow | G06F 9/5088 |
| 2017/0235588 | A1* | 8/2017 | Wang | G06F 21/577 718/1 |
| 2019/0236308 | A1 | 8/2019 | Allen et al. | |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Sep. 4, 2015), from https://nutanixbible.com/.

Poitras, Steven. "The Nutanix Bible" (Jan. 12, 2016), from https://nutanixbible.com/.

Poitras, Steven. "The Nutanix Bible" (Jun. 9, 2016), from https://nutanixbible.com/.

Poitras, Steven. "The Nutanix Bible" (Jan. 3, 2017), from https://nutanixbible.com/.

Poitras, Steven. "The Nutanix Bible" (Jun. 8, 2017), from https://nutanixbible.com/.

Poitras, Steven. "The Nutanix Bible" (Jan. 3, 2018), from https://nutanixbible.com/.

Poitras, Steven. "TheNutanix Bible" (Jun. 25, 2018), from https://nutanixbible.com/.

Poitras, Steven. "The Nutanix Bible" (Jan. 8, 2019), from https://nutanixbible.com/.

Poitras, Steven. "The Nutanix Bible" (Jul. 9, 2019), from https://nutanixbible.com/ (Publication date based on indicated capture date by Archive.org; first publication date unknown).

Poitras, Steven. "The Nutanix Bible" (Feb. 3, 2020), from https://nutanixbible.com/ (Publication date based on indicated capture date by Archive.org; first publication date unknown).

Poitras, Steven. "The Nutanix Bible" (Aug. 1, 2020), from https://nutanixbible.com/ (Publication date based on indicated capture date by Archive.org; first publication date unknown).

Poitras, Steven. "The Nutanix Bible" (Jan. 30, 2021), from https://nutanixbible.com/ (Publication date based on indicated capture date by Archive.org; first publication date unknown).

Cano, I. et al., "Curator: Self-Managing Storage for Enterprise Clusters", *14th USENIX Symposium on Networked Systems Design and Implementation, NSDI '17*, (Mar. 27, 2017).

Bijon, K. et al., "Mitigating Multi-Tenancy Risks in IaaS Cloud Through Constraints-Driven Virtual Resource Scheduling", *SACMAT'15*, (Jun. 1-3, 2015).

Varadarajan, V. et al., "Scheduler-based Defenses against Cross-VM Side-channels", *in USENIX Security Symposium* 2014, (Aug. 20-22, 2014).

Armstrong, B. et al., "About Hyper-V hypervisor scheduler type selection", Microsoft Docs, (Aug. 14, 2018).

Cooley, S et al., "Hyper-V HyperClear Mitigation for L1 Terminal Fault", Microsoft Docs, (Aug. 14, 2018).

Lefray, A. et al., "Microarchitecture-Aware Virtual Machine Placement under Information Leakage Constraints", $8^{th}$ *IEEE International Conference on Cloud Computing (IEEE Cloud* 2015), (Dec. 9, 2015).

Afoulki, Z. et al., "A Security-Aware Scheduler for Virtual Machines on IaaS Clouds", University of Orleans, (Aug. 2011).

Intel, "CPU Pinning and Isolation in Kubernetes", Application Note, Intel, (Dec. 2018).

Subramaniam, B., et al., "Feature Highlight: CPU Manager", Kubernetes, (Jul. 24, 2018).

\* cited by examiner

SECURITY-AWARE SCHEDULING OF VIRTUAL MACHINES IN A MULTI-TENANT INFRASTRUCTURE

CROSS-REFERENCE TO RELATED APPLICATION(S)

The present application claims the benefit of priority to U.S. Patent Application Ser. No. 62/945,686, titled "SCHEDULING OVERCOMMITTED VIRTUAL MACHINES IN A MULTI-TENANT INFRASTRUCTURE", filed on Dec. 9, 2019, which is hereby incorporated by reference in its entirety.

TECHNICAL FIELD

This disclosure relates to computer cluster management, and more particularly to techniques for security-aware scheduling of virtual machines in a multi-tenant infrastructure.

BACKGROUND

Modern virtualized computing systems are often deployed as a computing cluster formed of multiple computing nodes that host various virtualized entities (e.g., virtual machines, virtual disks, executable containers, etc.). The virtualized entities (VEs) each consume a certain portion of the physical resources (e.g., computing resources, storage resources, networking resources, etc.) of the nodes to support operation of the VEs. As an example, a system administrator can create a virtual machine (VM) at a node in a computing cluster to perform certain functionalities (e.g., a virtual desktop, a database engine, etc.). Historically, only a single tenant would be allocated to any given node of the cluster. The physical boundary of the given node is deemed to provide sufficient isolation between tenants in a multi-tenant environment (e.g., cloud-based IaaS environment), which isolation serves to avoid a wide range of security vulnerabilities. While this node-level physical isolation addresses many security concerns, it often leads to suboptimal resource allocation. For example, suppose a tenant assigns eleven users to a first node, each of which user needs a virtual desktop to run on the first node. Further suppose that if the incremental addition of the eleventh one of the new user's virtual desktop exceeds the resource availability of the first node, then a second node is allocated. In this example case, the eleventh user consumes only 10% of the second node, leaving 90% of the resource availability (e.g., CPU headroom) being unused. Although this allocation and assignment satisfies the aforementioned security isolation, this is wasteful, at least in the second node is underutilized. The load could be rebalanced between the two nodes, however this still leaves approximately 90% of available resources unutilized.

Accordingly, techniques for sharing the physical resources of the nodes of the clusters have evolved to include a more fine-grained allocation of resources. Specifically, fine-grained allocation of VMs can be carried out down to individual physical cores that constitute the CPUs of the nodes. For example, if a VM requires a 4-core virtual CPU (vCPU), then four of the physical cores of a 6-core physical CPU will be allocated to the VM. Since a particular VM will often not use its allocated CPU resources 100% of the time, system administrators often "overcommit" the CPU resources. As an example, the VM in the foregoing example might use the four physical cores assigned to it an average of 50% of the time. In this case, an admin might assign another 4-core VM to the node which results in having eight vCPU cores assigned to a node that has merely six physical CPU cores. In this case, the utilization of the CPU resources might be increased, but at the expense of possible workload delays while waiting for CPU resources to become available (e.g., the CPU "wait time"). Still, many VM users are satisfied with an allocation of CPU-time (e.g., average of 50% of four CPU cores) over a particular time period. Moreover, the security isolation between physical cores has been deemed sufficient by many tenants in a multi-tenant environment.

To facilitate the aforementioned fine-grained partitioning of the physical CPU resources, the simultaneous multi-threading (SMT) capability of today's multi-core CPUs is leveraged. Specifically, in an SMT regime, the operating system partitions each core of a physical CPU into multiple logical cores that are assigned workloads by the OS. For example, a node with six physical cores may be partitioned into 12 logical cores that each represents 50% of a physical core. In this case, the logical cores rather than the physical cores can be allocated to serve as the vCPU cores, providing CPU resource allocation on an arbitrarily fine-grained CPU-time basis.

Unfortunately, the security isolation between logical cores introduces several security vulnerabilities, thus presenting challenges in allocating virtual machines to logical CPU resources in a multi-tenant environment. As an example, certain elements (e.g., store buffers, fill buffers, load ports, uncacheable memory, etc.) of a common address space associated with a set of logical CPU cores from a CPU that utilizes speculative execution may potentially enable information disclosure via a side channel with local access. As such, there is an unwanted potential for information leaks between tenants who have respective VMs that use co-located logical cores of a particular CPU. One approach to address these security vulnerabilities is by reverting to isolation boundaries that are aligned with the boundaries of the physical CPU cores or even reverting to the physical isolation provided at the node level. However, these approaches again result in potential underutilization and/or overcommitment of CPU resources, which in turn may undesirably increase costs borne by the tenants and/or may decrease performance as seen by the tenants. What is needed is a way to assign VMs of multiple tenants to logical CPU cores while avoiding security vulnerabilities.

Therefore, what is needed is a technique or techniques that address security vulnerabilities when allocating virtual machines to logical CPU resources in a multi-tenant environment.

SUMMARY

The present disclosure describes techniques used in systems, methods, and in computer program products for security-aware scheduling of virtual machines in a multi-tenant infrastructure, which techniques advance the relevant technologies to address technological issues with legacy approaches. More specifically, the present disclosure describes techniques used in systems, methods, and in computer program products for scheduling of virtual machines into secure isolation groups in a multi-tenant infrastructure. Certain embodiments are directed to technological solutions for applying security rules to assign virtual machines to logical CPU resources in a multi-tenant computing environment.

The disclosed embodiments modify and improve over legacy approaches. In particular, the herein-disclosed techniques provide technical solutions that address the technical problems attendant to avoiding security vulnerabilities when allocating virtual machines to logical CPU resources in a multi-tenant environment. Such technical solutions involve specific implementations (i.e., data organization, data communication paths, module-to-module interrelationships, etc.) that relate to the software arts for improving computer functionality.

Many of the herein-disclosed embodiments for applying security rules to assign virtual machines to logical CPU resources in a multi-tenant computing environment are technological solutions pertaining to technological problems that arise in the hardware and software arts that underlie multi-tenant computing clusters. Aspects of the present disclosure achieve performance and other improvements in peripheral technical fields including, but not limited to, computing resource optimization techniques and secure computing on cloud computing infrastructure.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
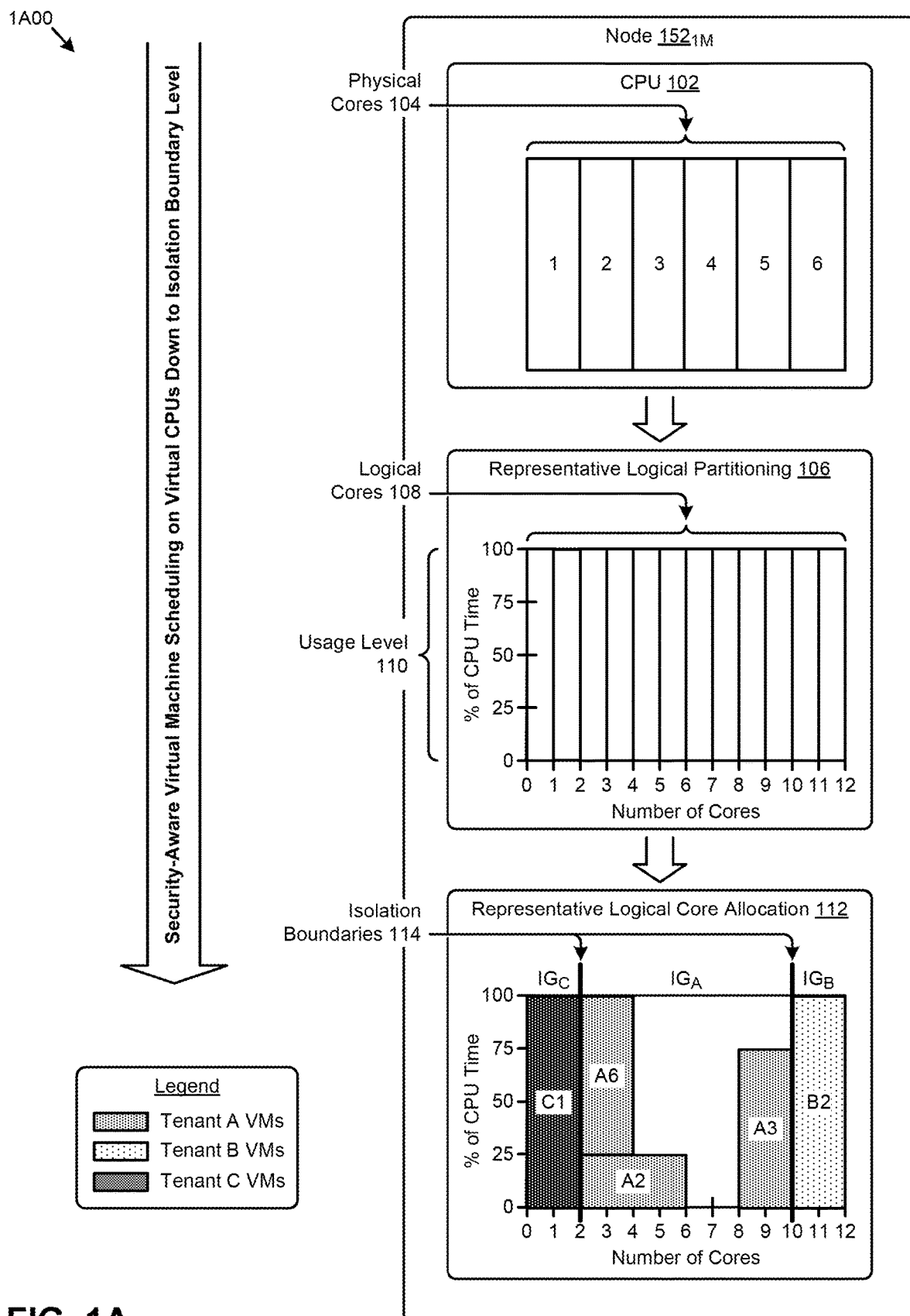
FIG. 1A depicts a CPU resource partitioning technique that can be practiced in accordance with the present disclosure, according to an embodiment.

Aspects of the present disclosure solve problems associated with avoiding security vulnerabilities when allocating virtual machines to logical CPU resources in a multi-tenant environment. These problems are unique to, and may have been created by, various computer-implemented methods that allocate virtual machines to logical CPU resources in a multi-tenant environment. Some embodiments are directed to approaches for applying security rules to assign virtual machines to logical CPU resources in a multi-tenant computing environment. The accompanying figures and discussions herein present example environments, systems, methods, and computer program products for security-aware scheduling of virtual machines in a multi-tenant infrastructure.

Overview

Disclosed herein are techniques for applying security rules to assign virtual machine (VM) virtual CPUs (vCPUs) to logical CPU resources in a multi-tenant computing environment. In certain embodiments, a VM is characterized by various attributes that at least describe its vCPU configuration and tenant association. A target computing environment (e.g., cluster) is characterized by attributes of its CPU resources, including attributes (e.g., number, location, utilization, etc.) of the logical cores available over the nodes in the environment. When a request to assign the VM to the target computing environment is received, a set of security rules are accessed. The security rules, for example, facilitate placement of the VM subject to constraints pertaining to tenant security isolation, logical core utilization, and/or other attributes. The security rules are applied to the VM attributes and the environment CPU attributes to determine the logical CPU resources to assign to the VM. In certain embodiments, a scheduling algorithm is implemented to apply the security rules in accordance with various objectives (e.g., scheduling time, etc.). In certain embodiments, the VM assignment is performed by a cluster management node.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A depicts a depicts a CPU resource partitioning technique 1A00 that can be practiced in accordance with the present disclosure. As an option, one or more variations of CPU resource partitioning technique 1A00 or any aspect thereof may be implemented in the context of the architecture and functionality of the embodiments described herein. The CPU resource partitioning technique 1A00 or any aspect thereof may be implemented in any environment.

FIG. 1A illustrates one technique for applying security rules when assigning virtual machines to logical CPU resources in a multi-tenant computing environment. Specifically, the figure is being presented to show one representative example of how various logical constructions (e.g., virtual CPUs, logical cores, isolation boundaries, etc.) can be defined and used for VM scheduling in multi-tenant computing environments.

The figure is representative of many modern virtualized computing systems where virtualized entities (e.g., virtual machines, virtual disks, executable containers, etc.) are hosted by various computing nodes that are grouped into computing clusters. The virtualized entities (VEs) share the CPU resources of the nodes and other resources (e.g., storage resources, networking resources, etc.) available at the clusters. As shown in the representative example of FIG. 1A, a node $152_{1M}$ has a CPU 102 (e.g., physical CPU) comprising a set of physical cores 104. In this example, the CPU (e.g., Intel Xeon ES-2620 CPU) has six physical cores. A particular physical CPU is often populated into a single "socket" on a motherboard, however, in some cases, a physical CPU can subsume multiple sockets (e.g., in the case of co-processor arrangements).

In multi-tenant computing clusters that provision access to a particular cluster by multiple tenants (e.g., users, groups of users, enterprises, etc.), individual physical cores can be allocated to a respective tenant to achieve certain security requirements of the tenants and/or cluster provider. One aspect of such security requirements pertains to information (e.g., data) leaks between tenants. For example, if a virtual machine (VM) having a 4-core virtual CPU (vCPU) from a first tenant is allocated to cores 1-4 of physical cores 104 and a VM having a 2-core vCPU from a second tenant is allocated to cores 5-6 of physical cores 104, the security isolation between the foregoing groups (e.g., cores 1-4 and cores 5-6) of physical cores 104 is often sufficient for the tenants.

As used herein, a virtual CPU is a logical construction within a virtual machine in a virtualization environment to represent hardware CPU resources. A virtual CPU of a virtual machine can be mapped onto hardware CPU components by a virtualization system component such as a hypervisor. In contrast, a logical CPU is construction that represents a portion of the capability of a physical CPU. An operating system (OS) can partition a physical CPU into multiple logical CPUs that are assigned workloads by the OS. Strictly as an example, a physical CPU having six physical cores might be partitioned into 12 logical CPUs, where each logical CPU represents 50% of the processing power of each physical core.

Since a particular VM will often not use its allocated CPU resources 100% of the time, system administrators often "overcommit" the CPU resources by assigning to a particular physical CPU more vCPU cores than the physical cores of the CPU. In this case, the utilization of the CPU resources might be increased, but at the expense of possible workload delays while waiting for CPU resources to become available. For example, if two VMs that share a set of physical cores cumulatively need greater than 100% of those physical cores at some moment in time, one VM will have to wait (e.g., CPU "wait time") for the other VM to release a portion of the CPU resources before it can complete its pending processes. Still, many VM users are satisfied with an allocation of CPU-time (e.g., average of 50% of four CPU cores) over a particular time period.

To facilitate such fine-grained CPU-time partitioning of the physical CPU resources, the simultaneous multithreading (SMT) capability of today's multi-core CPUs is leveraged. Specifically, in an SMT regime, the operating system partitions each physical core of a CPU into multiple logical cores that are assigned workloads by the OS. As shown in a representative logical partitioning 106, the six instances of physical cores 104 are partitioned into 12 instances of logical cores 108 that each represent 50% of a respective physical core. As can observed, a usage level 110 indicates that each of the logical cores 108 can be further partitioned by the expected usage (e.g., in percent of total time) of the respective logical cores. In this case, portions of logical cores rather than entire physical cores can be allocated to respective vCPU cores.

The security isolation between logical cores, however, introduces several security vulnerabilities, thus presenting challenges in allocating virtual machines to logical CPU resources in a multi-tenant environment. As an example, certain elements (e.g., store buffers, fill buffers, load ports, uncacheable memory, etc.) of a common address space associated with a set of logical cores from a CPU that utilizes speculative execution may potentially enable information disclosure via a side channel with local access. As such, there is an unwanted potential for information leaks between tenants who have respective VMs that use co-located logical cores of a particular CPU.

The herein disclosed techniques address such security vulnerabilities when allocating VMs to logical CPU resources in a multi-tenant computing environment. Specifically, as shown in a representative logical core allocation 112, application of the herein disclosed techniques facilitates placement of VM vCPUs from multiple tenants that respect one or more instances of isolation boundaries 114. An isolation group boundary serves to achieve the security requirements of the tenants by forming different isolation group boundaries for each respective tenant. For example, isolation group IGA comprises a set of VMs (e.g., $VM_{A2}$, $VM_{A3}$, and $VM_{A6}$) from tenant A, isolation group $IG_B$ comprises a VM (e.g., $VM_{B2}$) from tenant B, and isolation group $IG_C$ comprises a VM (e.g., $VM_{C1}$) from tenant C. As can be observed, the isolation boundaries 114 are aligned with the boundaries of physical cores 104 of CPU 102 to prevent information leakage between the tenants.

The foregoing discussion of FIG. 1A describes a representative logical core allocation (e.g., representative logical core allocation 112) facilitated by an application of the herein disclosed techniques, which application is disclosed in further detail as follows.

Figure 1B:
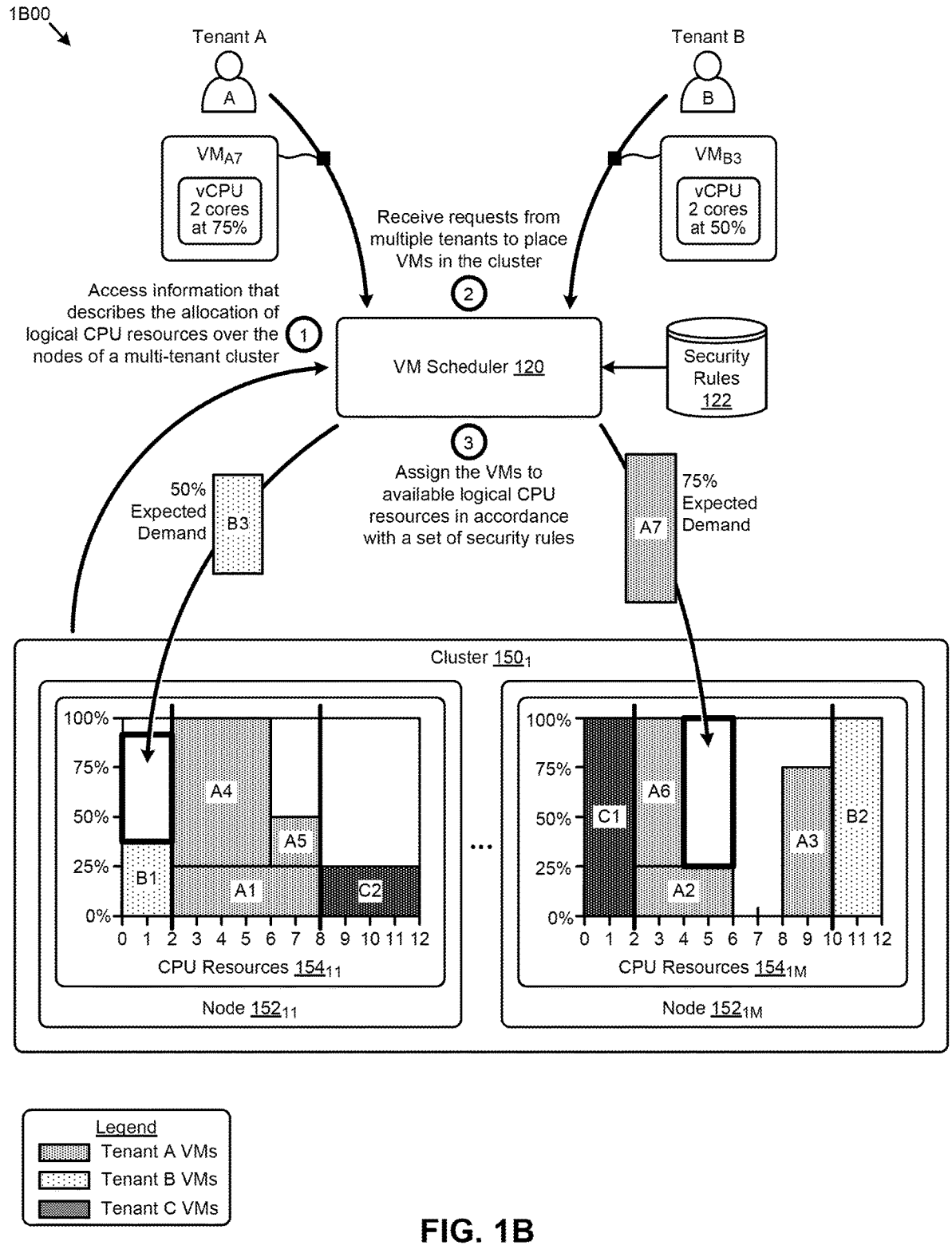
FIG. 1B illustrates a computing environment in which embodiments of the present disclosure can be implemented.

FIG. 1B illustrates a computing environment 1B00 in which embodiments of the present disclosure can be implemented. As an option, one or more variations of computing environment 1B00 or any aspect thereof may be implemented in the context of the architecture and functionality of the embodiments described herein.

FIG. 1B illustrates aspects pertaining to applying security rules to assign virtual machines to logical CPU resources in a multi-tenant computing environment. Specifically, FIG. 1B presents a logical depiction of how the herein disclosed techniques are used to process requests from multiple tenants to place VMs over multiple nodes in a computing cluster. A representative set of high order operations are also presented to illustrate how the herein disclosed techniques might be applied in computing environment 1B00.

As shown in the logical depiction of FIG. 1B, the herein disclosed techniques address challenges pertaining to achieving security requirements when assigning VMs to logical CPU resources at least in part by a VM scheduler 120 implemented in association with a cluster 150$_1$. Cluster 150$_1$ in computing environment 1B00 comprises multiple nodes (e.g., node 152$_{11}$, ..., node 152$_{1M}$) that host computing resources accessible by multiple tenants (e.g., tenant A, tenant B, etc.). As can be observed, VM scheduler 120 continuously accesses information that describes the then-current allocation of the logical representations of CPU resources (e.g., CPU resources 154$_{11}$, ..., CPU resources 154$_{1M}$) over the nodes of cluster 150$_1$ (operation 1). Such information might comprise attributes that describe the number of logical cores, the logical-to-physical core mapping, the logical core allocation utilization, and/or other attributes. Respective graphical views of such attributes for CPU resources 154$_{11}$ and CPU resources 154$_{1M}$ are shown in the figure.

At various moments in time, VM scheduler 120 receives requests from multiple tenants to place VMs in cluster 150$_1$ (operation 2). As merely examples, VM scheduler 120 receives a request from tenant A to place a VM (e.g., VM$_{A7}$) in the cluster and a request from tenant B to place a VM (e.g., VM$_{B3}$) in the cluster. In some cases, VM placement requests might be issued by a system controller to, for example, improve system resource utilization, respond to system failures, and/or to achieve other objectives. In the scenario illustrated in FIG. 1B, the vCPU of VM$_{A7}$ is configured to have two cores with an expected utilization of 75% and the vCPU of VM$_{B3}$ is configured to have two cores with an expected utilization of 50%. When VM scheduler 120 receives these vCPU configuration attributes and/or other attributes (e.g., tenant identifier, etc.) associated with the requests, a set of security rules 122 are accessed. A set of rules (e.g., rule base) such as security rules 122 or any other rules described herein, comprises data records storing various information that can be used to form one or more constraints to apply to certain functions and/or operations. For example, the information pertaining to a rule in the rule base might comprise the conditional logic operands (e.g., input variables, conditions, constraints, etc.) and/or operators (e.g., "if", "then", "and", "or", "greater than", "less than", etc.) for forming a conditional logic statement that returns one or more results. In some cases, the information pertaining to a rule might comprise the conditions (e.g., predicates, conditional expressions, field names, field values, etc.) and commands and clauses (e.g., "select", "where", "order by", etc.) for forming a data statement (e.g., query) that returns one or more results. Security rules 122, for example, facilitate placement of the VM subject to constraints pertaining to tenant security isolation, logical core utilization, and/or other attributes. Descriptions of example security rules are presented in Table 1.

TABLE 1

Example Security Rules

| Rule | Purpose | Description |
| --- | --- | --- |
| 1 | Isolation between Logical Cores | A logical core is used by up to one isolation group |
| 2 | Tenant Isolation | An isolation group is used by no more than one tenant |
| 3 | Assignability | All of the vCPUs can be assigned to at least one logical core |
| 4 | Performance | The cumulative CPU-time usage of vCPUs assigned to a logical core cannot exceed 100% (i.e., is limited to 100%) |
| 5 | Parallelism | The vCPUs of every VM must be able to run on distinct cores |

The portion of security rules 122 that pertain to cluster 150$_1$ and/or pertain to tenant A and tenant B are applied by VM scheduler 120 to the VM attributes (e.g., received in VM placement requests) and the then-current CPU resource attributes to determine the logical CPU resources to assign to the VMs (operation 3). As can be observed, VM scheduler 120 assigned VM$_{A7}$ to logical cores 5-6 of node 152$_{1M}$ and assigned VM$_{B3}$ to logical cores 1-2 of node 152$_{11}$. In this case, while there was available CPU resource capacity (e.g., headroom) at both nodes to host either or both VMs, security rules 122 constrained the placement of the VMs to locations having compatible isolation groups. Specifically, VM$_{A7}$ was assigned to CPU resources having sufficient headroom within an isolation group comprising other VMs (e.g., VM$_{A2}$, VM$_{A3}$, and VM$_{A6}$) from tenant A, and VM$_{B3}$ was assigned to CPU resources having sufficient amount of available CPU headroom in an isolation group comprising other VMs (e.g., VM$_{B1}$) from tenant B. As can be seen, the desired degree of security is achieved when all of the security rules are observed. Moreover, observance of all of the security rules can lead to an optimal placement within the cluster. Still further, the foregoing rules are merely examples. Additional or different rules covering applicability and/or security and/or performance can be configured by a cluster administrator.

One embodiment for use of rule-based VM assignments over multi-tenant computing clusters is disclosed in further detail as follows.

Figure 2:
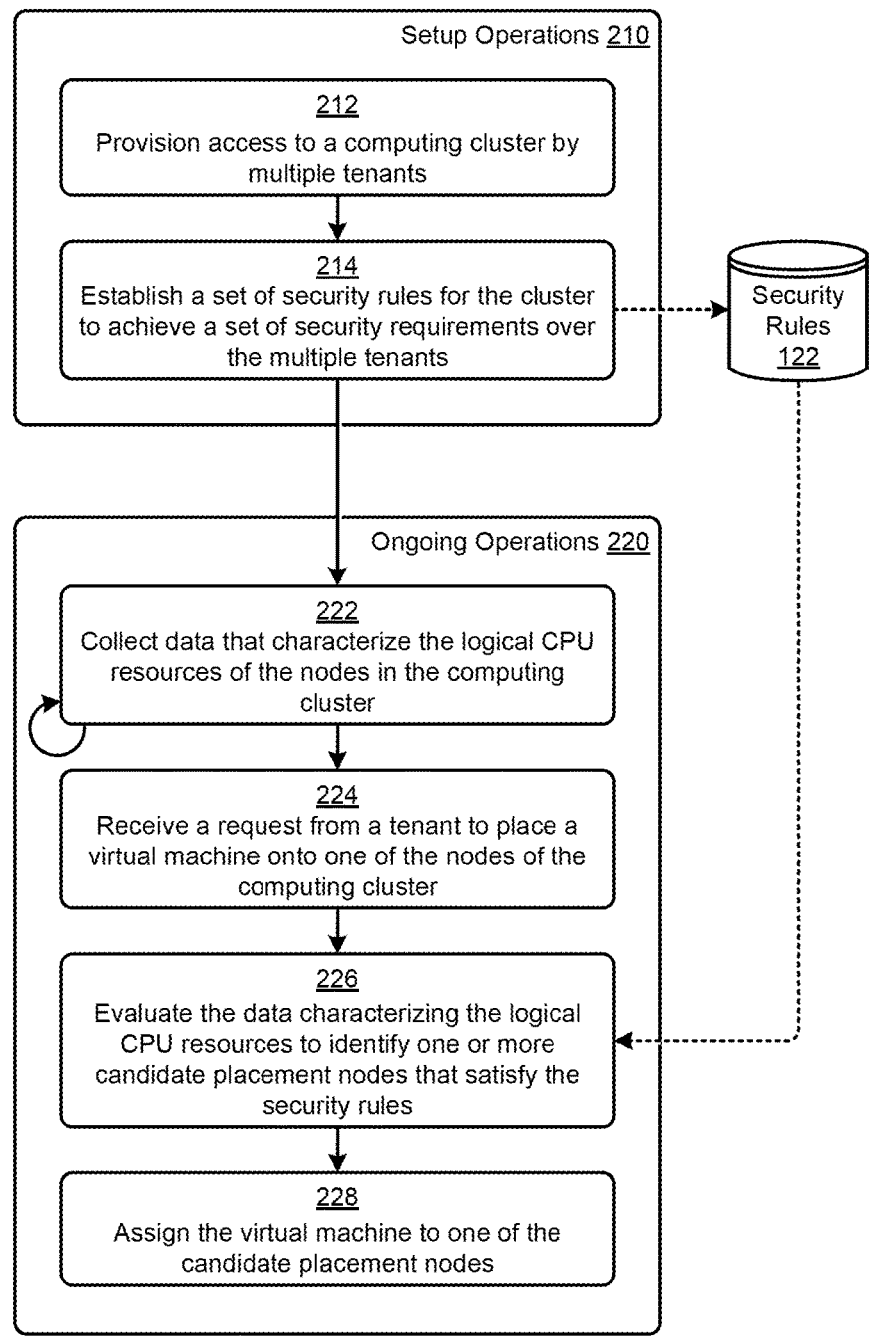
FIG. 2 depicts an example rule-based virtual machine assignment technique as implemented in systems that facilitate security-aware scheduling of virtual machines in a multi-tenant infrastructure, according to an embodiment.

FIG. 2 depicts an example rule-based virtual machine assignment technique 200 as implemented in systems that facilitate security-aware scheduling of virtual machines in a multi-tenant infrastructure. As an option, one or more variations of rule-based virtual machine assignment technique 200 or any aspect thereof may be implemented in the context of the architecture and functionality of the embodiments described herein. The rule-based virtual machine assignment technique 200 or any aspect thereof may be implemented in any environment.

FIG. 2 illustrates aspects pertaining to applying security rules to assign virtual machines to logical CPU resources in a multi-tenant computing environment. Specifically, the figure is presented to illustrate one embodiment of certain steps and/or operations performed over a network of devices (e.g., user devices, computing systems, etc.) to establish a set of security rules that are used to achieve security requirements when placing VMs from multiple tenants over a computing cluster. As can be observed, the steps and/or operations can be grouped into a set of setup operations 210 and a set of ongoing operations 220.

Setup operations 210 of rule-based virtual machine assignment technique 200 commences by provisioning access to a computing cluster by multiple tenants (step 212). As merely one example, the computing cluster might be part of a cloud-based IaaS platform that serves multiple tenants. In this case, a tenant is a group of one or more users who share a common access and/or sets of privileges as pertains to the data, configuration, user management, tenant-specific functionality, and/or other properties of the cluster. Inherent in such multi-tenant clusters is a requirement to observe secure isolation between the resources of the respective tenants. To achieve such security requirements, a set of security rules (e.g., security rules 122) for the cluster is established (step 214).

On a continuous or nearly-continuous basis, data that characterize the logical representations of the CPU resources over the nodes of the cluster are collected (step 222). At some moment in time, a request from a tenant to place a VM onto one of the nodes of the computing cluster is received (step 224). The data characterizing the logical CPU resources is evaluated subject to the security rules to identify one or more candidate placement nodes (step 226). In clusters comprising many (e.g., hundreds) nodes, more than one candidate placement nodes that satisfy the security rules is often discovered. The VM corresponding the request is then assigned to the CPU resources of one of the candidate placement nodes (step 228). As merely one example, the candidate placement node identified for the assignment might be selected based at least in part on one or more optimization rules designed to optimize various objectives associated with cluster-wide resource utilization, load balancing, and/or other cluster attributes.

One embodiment of a system, data flows, and data structures for implementing the rule-based virtual machine assignment technique 200 and/or other herein disclosed techniques, is disclosed as follows.

Figure 3:
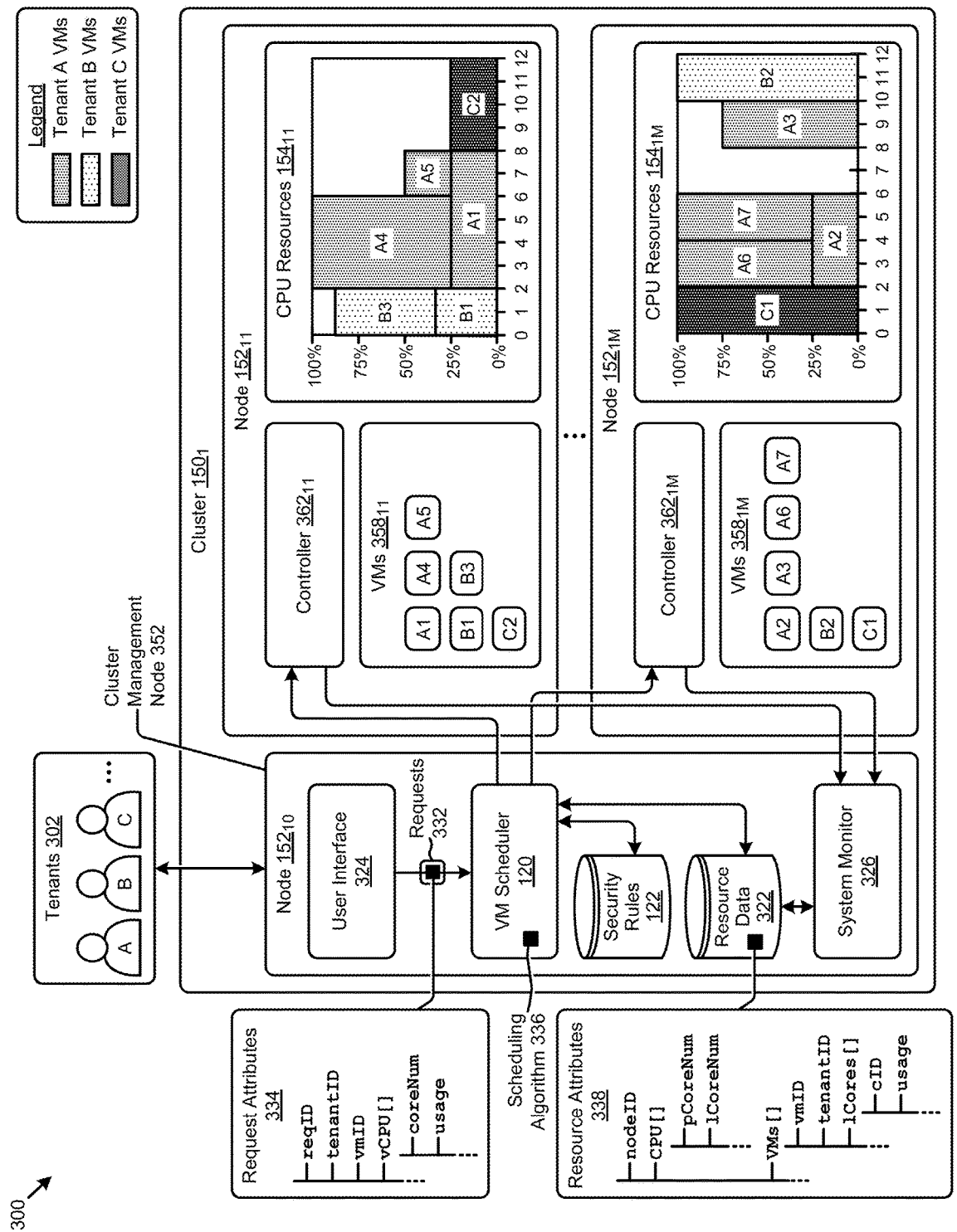
FIG. 3 is a block diagram of a system that implements security-aware scheduling of virtual machines in a multi-tenant infrastructure, according to an embodiment.

FIG. 3 is a block diagram of a system 300 that implements security-aware scheduling of virtual machines in a multi-tenant infrastructure. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to applying security rules to assign virtual machines to logical CPU resources in a multi-tenant computing environment. Specifically, the figure is being presented to show one embodiment of certain representative components and associated data structures and data flows implemented in a computing environment to facilitate the herein disclosed techniques. These and other data structures described herein are designed to improve the way a computer stores and retrieves data in memory when performing the herein disclosed techniques. Such data structures can be implemented in a computing and/or storage system using various techniques. For example, the various representative data structures depicted in system 300 indicate that the data associated with the structures might be organized and/or stored in a tabular structure (e.g., relational database table) that has rows that relate various attributes with a particular data entity. As another example, the underlying data might be organized and/or stored in a programming code object that has instances corresponding to a particular data entity and properties corresponding to the various attributes associated with the data entity.

As shown, the components, data flows, and data structures in system 300 are associated with a set of tenants 302 (e.g., tenant A, tenant B, tenant C, etc.) that interact with a cluster $150_1$ comprising multiple nodes (e.g., node $152_{10}$, node $152_{11}$, ..., node $152_{1M}$). Specifically, tenants 302 interact with a user interface 324 hosted by node 1521o. As can be observed, node $152_{10}$ is selected as a cluster management node 352. As such, cluster management node 352 also comprises an instance of VM scheduler 120 with access to an instance of security rules 122 to manage cluster-wide VM placement over cluster $150_1$. Tenants 302 access user interface 324 to issue instances of requests 332 for VM placement over the cluster. VM scheduler 120 receives these instances of requests 332 and communicates with respective controllers (e.g., controller $362_{11}$, ..., controller $362_{1M}$) at the nodes to assign respective sets of tenant VMs (e.g., VMs $358_{11}$, ..., VMs $358_{1M}$) to the logical CPU resources (e.g., CPU resources $154_{11}$, ..., CPU resources $154_{1M}$) of the nodes.

As depicted in request attributes 334, a payload for a particular request might include a request identifier (e.g., stored in a "reqID" field), a tenant identifier (e.g., stored in a "tenantID" field), a VM identifier (e.g., stored in a "vmID" field), a description of the vCPU associated with the VM (e.g., stored in a "vCPU[ ]" object), and/or other user attributes. As shown, the description of each vCPU of the VM includes a count of the logical cores of the vCPU (e.g., stored in a "coreNum" field), a usage level rule for the cores (e.g., stored in a "usage" field), and/or other attributes.

In some cases, a scheduling algorithm 336 is implemented at VM scheduler 120 to facilitate assignment of the VMs to the nodes. As merely one example, scheduling algorithm 336 might be designed to heuristically solve a bin-packing problem, where the bins are the logical cores and the items are the vCPUs having variable width (e.g., number of cores) and height (e.g., usage percentage).

According to the herein disclosed techniques, data characterizing such logical CPU resources is accessed by VM scheduler 120 to facilitate placement of the VMs for tenants 302. In system 300, such data is collected by a system monitor 326 implemented at cluster management node 352 and stored in a set of resource data 322. More specifically, system monitor 326 collects the logical CPU resource data from the respective controllers at each node and stores it in resource data 322. As depicted in resource attributes 338, a data record (e.g., table row or object instance) for a particular node might include a node identifier (e.g., stored in a "nodeID" field), a description of the CPU of the node (e.g., stored in a "CPU[ ]" object), a description of the VMs at the node (e.g., stored in a "$v_M$[ ]" object), and/or other user attributes. As shown, the description of each CPU at the node includes a total count of the physical cores of the CPU (e.g., stored in a "pcoreNum" field), a total count of the logical cores of the CPU (e.g., stored in an "lCoreNum" field), and/or other attributes. The description of each VM at the node includes a VM identifier (e.g., stored in a "vmID" field), an associated tenant identifier or isolation group identifier (e.g., stored in a "tenant ID" field), and a description of each of the logical cores assigned to the VM (e.g., stored in an "lcores[ ]" object)—which includes a logical core identifier (e.g., stored in a "cID" field), a usage level of the core (e.g., stored in a "usage" field), and/or other attributes.

The foregoing discussions include techniques for identifying candidate VM placement nodes (e.g., step 226 of FIG. 2) and assigning a VM to one of the candidate nodes (e.g., step 228 of FIG. 2), which techniques are disclosed in further detail as follows.

Figure 4A:
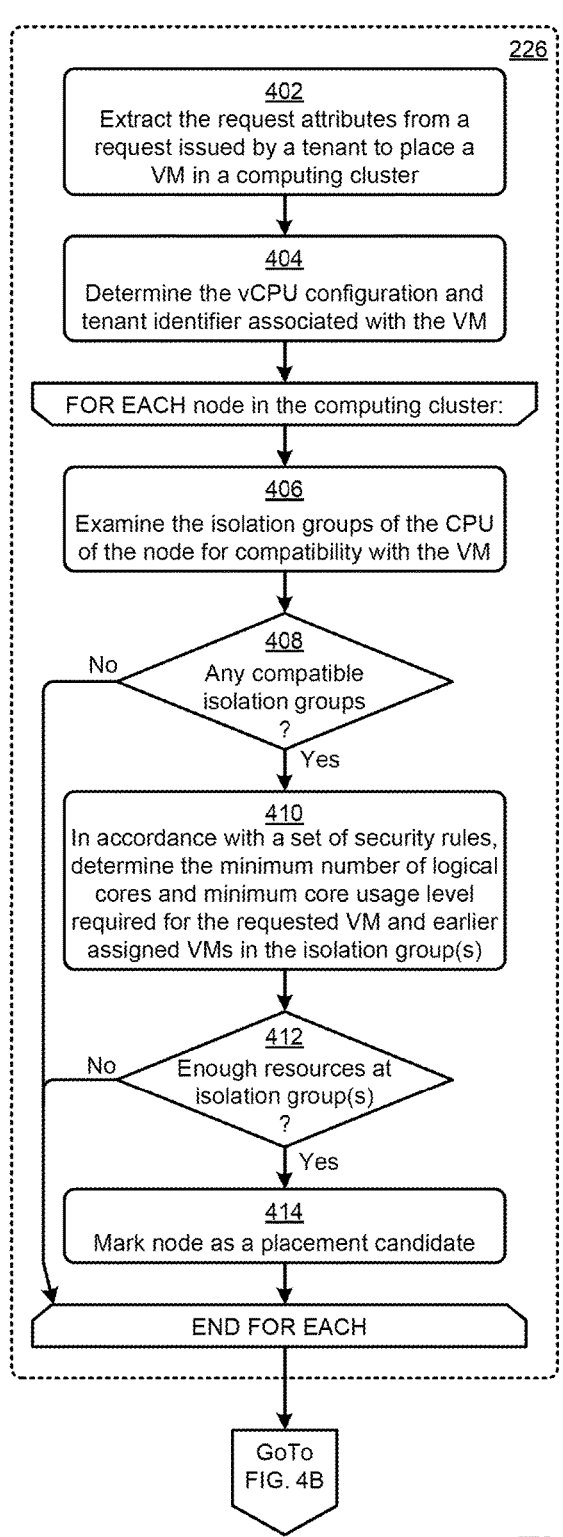
FIG. 4A and FIG. 4B present a virtual CPU allocation technique as implemented in systems that facilitate security-aware scheduling of virtual machines in a multi-tenant infrastructure, according to an embodiment.
Figure 4A:
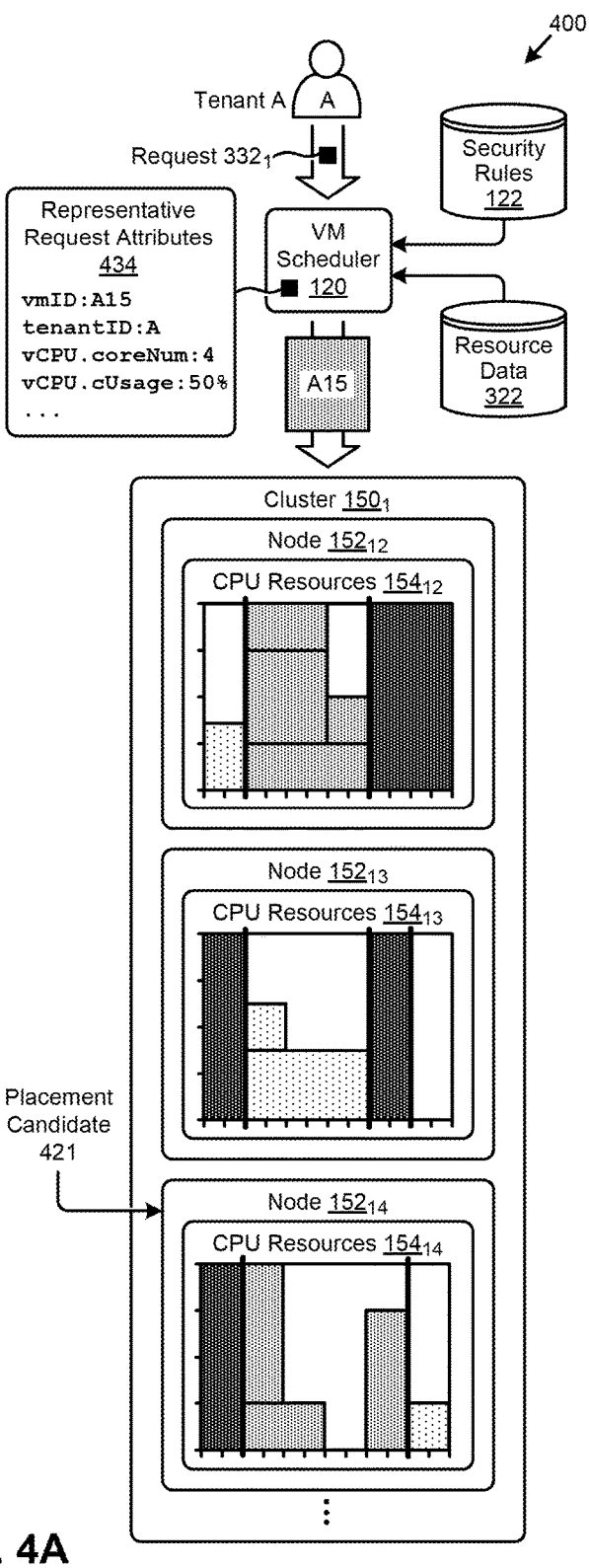
Figure 4B:
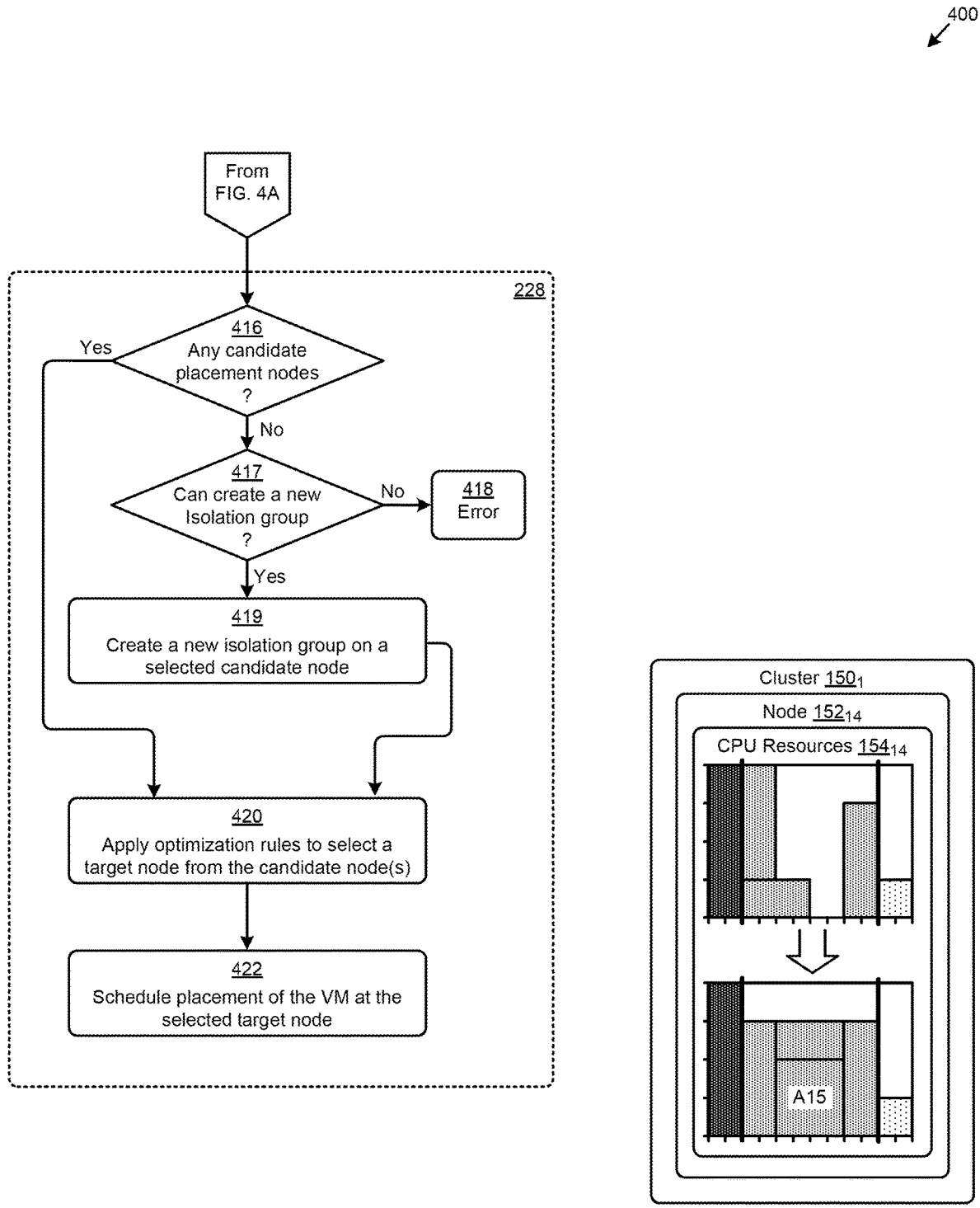

FIG. 4A and FIG. 4B present a virtual CPU allocation technique 400 as implemented in systems that facilitate security-aware scheduling of virtual machines in a multi-tenant infrastructure. As an option, one or more variations of virtual CPU allocation technique 400 or any aspect thereof may be implemented in the context of the architecture and functionality of the embodiments described herein. The virtual CPU allocation technique 400 or any aspect thereof may be implemented in any environment.

FIG. 4A and FIG. 4B illustrate aspects pertaining to applying security rules to assign virtual machines to logical CPU resources in a multi-tenant computing environment. Specifically, the figure is presented to illustrate one embodiment of certain steps and/or operations that facilitate identifying candidate VM placement nodes and assigning a VM to one of the candidate nodes. As depicted in the figure, the steps and/or operations are associated with step 226 and step 228 of FIG. 2. A representative scenario is also shown in the figure to illustrate an example application of virtual CPU allocation technique 400.

Referring to FIG. 4A, virtual CPU allocation technique 400 commences by extracting the request attributes from a request issued by a tenant to place a VM in a multi-tenant computing cluster (step 402). These attributes and/or other information can be used to determine the vCPU configuration (e.g., number and usage of cores) and tenant identifier associated with the VM (step 404). As illustrated in the scenario of FIG. 4A, a request $332_1$ is received by VM scheduler 120 from tenant A to place a VM in a node (e.g., node $152_{12}$, node $152_{13}$, node $152_{14}$, etc.) of cluster $150_1$. A set of representative request attributes 434 indicate VM scheduler 120 might extract from request $332_1$ at least a VM identifier of "A15", a tenant identifier of "A", and vCPU configuration information comprising a number of vCPU cores equal to "4" and a usage level equal to "50%".

For each node in the computing cluster, the isolation groups of the CPU at the node are evaluated for compatibility with the VM to be placed (step 406). An isolation group is compatible with a VM if they share a common tenant identifier, or if the isolation group is unassigned and thereby available. As an example, VM scheduler 120 might access resource data 322 to determine the then-current tenant identifiers associated with the isolation groups that constitute the CPU resources at the subject node. Specifically, resource data 322 might indicate that: the CPU resources $154_{12}$ of node $152_{12}$ has isolation groups assigned to tenants A, B, and C; and that the CPU resources $154_{13}$ of node $152_{13}$ has isolation groups assigned to tenants B and C, and one unassigned isolation group (e.g., logical cores 11-12); and that, the CPU resources $154_{14}$ of node $152_{14}$ has isolation groups assigned to tenants A, B, and C, and one unassigned isolation group (e.g., logical cores 7-8).

If no isolation groups compatible with the VM to be placed are found ("No" path of decision 408), then the next node in the cluster is examined. If one or more isolation groups at the node are compatible with the VM ("Yes" path of decision 408), further analysis is performed over the subject node and corresponding CPU resources. Specifically, in accordance with a set of security rules, the minimum number of logical cores and minimum usage level required for all VMs—including the requested VM—associated with the compatible isolation groups are determined (step 410). For example, VM scheduler 120 might apply a bin-packing algorithm subject to security rules 122 (e.g., rules as described in Table 1) to the compatible isolation groups at the subject node. If there are not enough available logical cores or not enough available CPU headroom resources over the compatible isolation groups to accommodate the requested VM and earlier assigned VMs ("No" path of decision 412), then another node is examined. If there are enough CPU resources over the compatible isolation groups to accommodate the requested VM and earlier assigned VMs ("Yes" path of decision 412), the node is marked as a placement candidate (step 414). Referring to the representative example nodes of cluster $150_1$, CPU resources $154_{12}$ has a compatible tenant A isolation group but will not accommodate the minimum number of logical cores (e.g., 8) and a core usage rule limitation of 100% (e.g., rule 4 in Table 1) when VM "A15" is added. Moreover, CPU resources $154_{13}$ has a compatible unassigned isolation group but will not accommodate the minimum number of logical cores (e.g., 4) when VM "A15" is added. CPU resources $154_{14}$ has a compatible tenant A isolation group and can accommodate the minimum number of logical cores (e.g., 8) and comply with headroom rules when VM "A15" is added. Node $152_{14}$ is thereby marked as a placement candidate 421.

Referring to FIG. 4B, virtual CPU allocation technique 400 continues by checking if any candidate placement nodes exist in cluster $150_1$. If no candidate placement nodes exist ("No" path of decision 416), then a check is entered to determine of an isolation group can be created on any of the nodes of the cluster. If so, the "Yes" path of decision 417 is taken and at step 419, a new isolation group that comports with the security rules is created on an available node, which available node is deemed to be the target node. The "Yes" path of decision 417 might be taken repeatedly during initial mapping of these logical constructs to nodes of the cluster. Strictly as an example, the "Yes" path of decision 417 might be taken after a new node is added to the cluster (e.g., to add additional available CPU headroom to the resources of the cluster).

On the other hand, if decision 416 determines that there are no candidate placement nodes, and additionally decision 417 determines that no new isolation group can be created, then the "No" path of decision 417 is taken, and an error is returned (step 418). Strictly as one example, a message might be delivered to the user or administrator who issued the VM placement request indicating that a suitable placement location was not found. In this case, a message might recommend adding nodes to the cluster, or the message might recommend removing VMs with little or no activity, or the message might recommend reducing the usage levels of existing VMs, or the message might recommend migration of existing VMs, or the message might recommend changing migration rules and/or thresholds etc.

If one or more candidate placement nodes exist ("Yes" path of decision 416), optimization rules are applied to select a target node from the candidate node(s) (step 420). For example, such optimization rules might be designed to select a target node based at least in part on cluster-wide resource utilization, load balancing, and/or other cluster attributes. In the example scenario of FIG. 4B, only one placement candidate node (e.g., node $152_{14}$) exists, thus eliminating the step of selecting from multiple candidates. In other scenarios, there may be multiple placement candidates, or in some scenarios, placement candidate might be only the selected target node that was initialized with a new isolation group (step 419). In any of these scenarios, when a target node is identified, the placement (e.g., creation, migration, etc.) of the VM is scheduled for the target node (step 422). As illustrated by the transformation of CPU resources $154_{14}$, VM scheduler 120 might modify the vCPU assignments in the tenant A isolation group when placing VM "A15" at node $152_{14}$.

Figure 5:
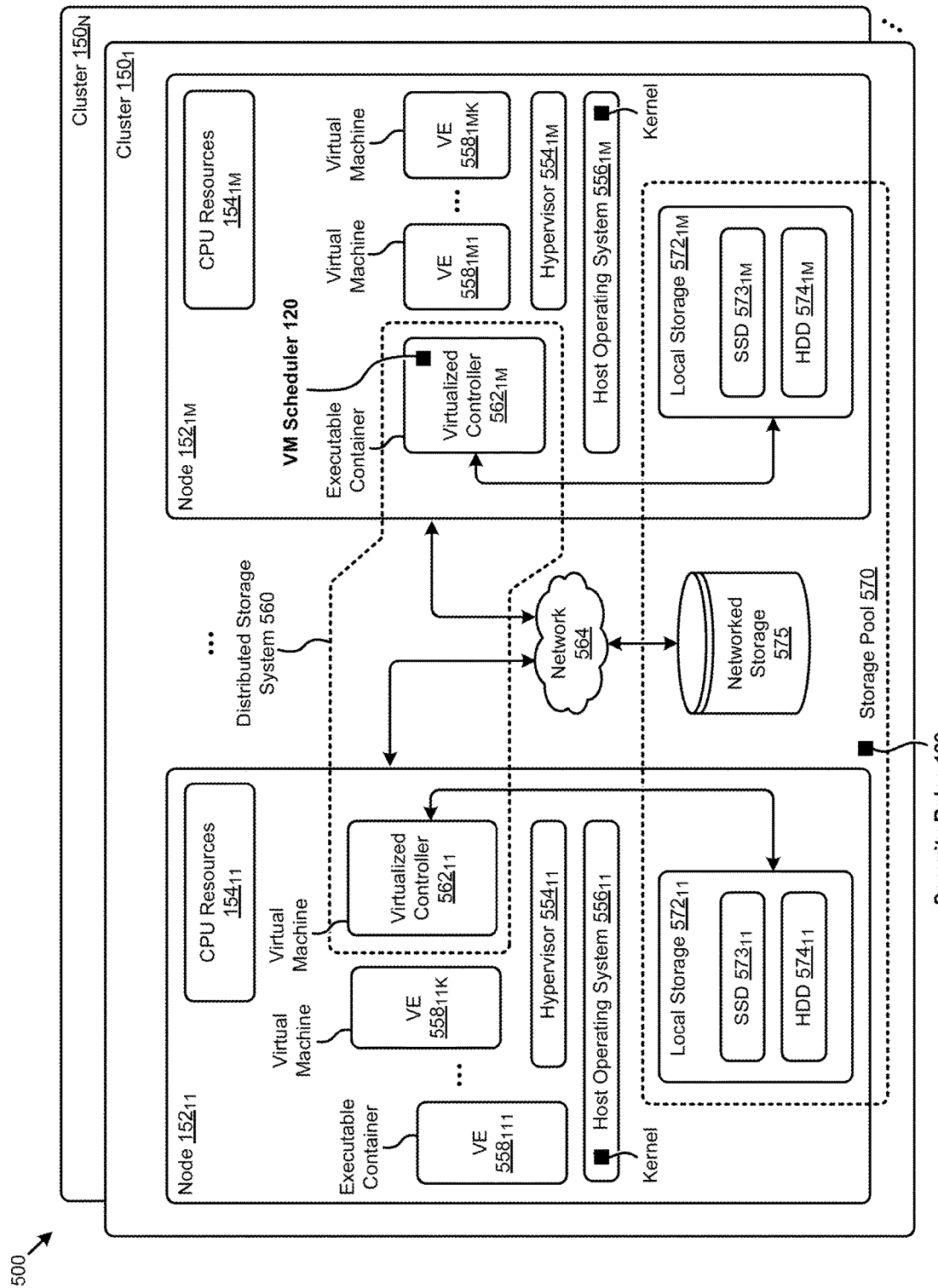
FIG. 5 presents a distributed virtualization environment in which embodiments of the present disclosure can be implemented, according to some embodiments.

An example of a distributed virtualization environment (e.g., multi-cluster distributed computing environment, etc.) that supports any of the herein disclosed techniques is presented and discussed as pertains to FIG. 5.

FIG. 5 presents a distributed virtualization environment 500 in which embodiments of the present disclosure can be implemented. As an option, one or more variations of distributed virtualization environment 500 or any aspect thereof may be implemented in the context of the architecture and functionality of the embodiments described herein. The distributed virtualization environment 500 or any aspect thereof may be implemented in any environment.

FIG. 5 illustrates aspects pertaining to applying security rules to assign virtual machines to logical CPU resources in a multi-tenant computing environment. Specifically, the figure presents a logical depiction of how the herein disclosed techniques can be implemented in a virtualized distributed computing environment to facilitate compliance with security requirements when allocating virtual machines to logical CPU resources in a multi-tenant environment.

The shown distributed virtualization environment depicts various components associated with instances of distributed virtualization systems (e.g., hyperconverged distributed systems) that can be used to implement the herein disclosed techniques. Specifically, the distributed virtualization environment 500 comprises multiple clusters (e.g., cluster $150_1$, . . . , cluster $150_N$) comprising multiple nodes that have multiple tiers of storage in a storage pool. Representative nodes (e.g., node $152_{11}$, . . . , node $152_{1M}$) and storage pool 570 associated with cluster $150_1$ are shown. Each node can be associated with one server, multiple servers, or portions of a server. The nodes can be associated (e.g., logically and/or physically) with the clusters. As shown, the multiple tiers of storage include storage that is accessible through a network 564, such as a networked storage 575 (e.g., a storage area network or SAN, network attached storage or NAS, etc.). The multiple tiers of storage further include instances of local storage (e.g., local storage $572_{11}$, . . . , local storage $572_{1M}$). For example, the local storage can be within or directly attached to a server and/or appliance associated with the nodes. Such local storage can include solid state drives (SSD $573_{11}$, . . . , SSD $573_{1M}$), hard disk drives (HDD $574_{11}$, . . . , HDD $574_{1M}$), and/or other storage devices.

As shown, any of the nodes of the distributed virtualization environment 500 can implement one or more user virtualized entities (e.g., VE $558_{111}$, . . . , VE $588_{11K}$, VE $557_{1M1}$, . . . , VE $558_{1MK}$, such as virtual machines (VMs) and/or executable containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $556_{11}$, . . . , host operating system $556_{1M}$), while the VMs run multiple applications on various respective guest operating systems. The VMs further comprise virtual CPUs (vCPUs) that are assigned to logical partitions of the CPU resources (e.g., CPU resources $154_{11}$, . . . , CPU resources $154_{1M}$) of the nodes. Such flexibility can be facilitated at least in part by a hypervisor (e.g., hypervisor $554_{11}$, . . . , hypervisor $554_{1M}$), which hypervisor is logically located between the various guest operating systems of the VMs and the host operating system of the physical infrastructure (e.g., node).

As an alternative, executable containers may be implemented at the nodes in an operating system-based virtualization environment or container virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $556_{11}$, . . . , host operating system $556_{1M}$) without, in most cases, a hypervisor layer. This lightweight implementation can facilitate efficient distribution of certain software components, such as applications or services (e.g., micro-services). Any node of a distributed virtualization environment 500 can implement both a hypervisor-assisted virtualization environment and a container virtualization environment for various purposes. Also, any node in a distributed virtualization environment can implement a virtualized controller to facilitate access to storage pool 570 by the VMs and/or the executable containers.

As used in these embodiments, a virtualized controller is a collection of software instructions that serve to abstract details of underlying hardware or software components from one or more higher-level processing entities. A virtualized controller can be implemented as a virtual machine, as an executable container (e.g., a Docker container), or within a layer (e.g., such as a layer in a hypervisor).

Multiple instances of such virtualized controllers can coordinate within a cluster to form the distributed storage system 560 which can, among other operations, manage the storage pool 570. This architecture further facilitates efficient scaling in multiple dimensions (e.g., in a dimension of computing power, in a dimension of storage space, in a dimension of network bandwidth, etc.).

The foregoing virtualized controllers can be implemented in the distributed virtualization environment using various techniques. As one specific example, an instance of a virtual machine at a given node can be used as a virtualized controller in a hypervisor-assisted virtualization environment to manage storage and I/O (input/output or IO) activities. In this case, for example, the virtualized entities at node $152_{11}$ can interface with a controller virtual machine (e.g., virtualized controller $562_{11}$) through hypervisor $554_{11}$ to access storage pool 570. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 560. For example, a hypervisor at one node in the distributed storage system 560 might correspond to software from a first vendor, and a hypervisor at another node in the distributed storage system 560 might correspond to a second software vendor. As another virtualized controller implementation example, executable containers (e.g., Docker containers) can be used to implement a virtualized controller (e.g., virtualized controller $562_{1M}$) in an operating system virtualization environment at a given node. In this case, for example, the virtualized entities at node $152_{1M}$ can access the storage pool 570 by interfacing with a controller container (e.g., virtualized controller $562_{1M}$) through hypervisor $554_{1M}$ and/or the kernel of host operating system $556_{1M}$.

In certain embodiments, one or more instances of agents and associated data structures can be implemented in the distributed storage system 560 to facilitate the herein disclosed techniques. Specifically, an instance of VM scheduler 120 can be implemented in the virtualized controller $562_{1M}$ of node $152_{1M}$. Such instances of VM scheduler 120 can be implemented in any node in any cluster. As earlier mentioned, VM scheduler 120 might be implemented in any node elected and/or configured as the cluster management node. One or more instances of security rules 122 may also be implemented over storage pool 570. Actions taken by one or more instances of the VM scheduler 120 can apply to a node (or between nodes), and/or to a cluster (or between clusters), and/or between any resources or subsystems accessible by VM scheduler 120 or associated agents.

As earlier described, the problems attendant to security vulnerabilities when allocating virtual machines to logical CPU resources in a multi-tenant environment can be addressed in the context of the foregoing environment. Moreover, any aspect or aspects of applying security rules to assign virtual machines to logical CPU resources in a multi-tenant computing environment can be implemented in in the context of the foregoing environment.

Additional Embodiments of the Disclosure

Additional Practical Application Examples

Figure 6:
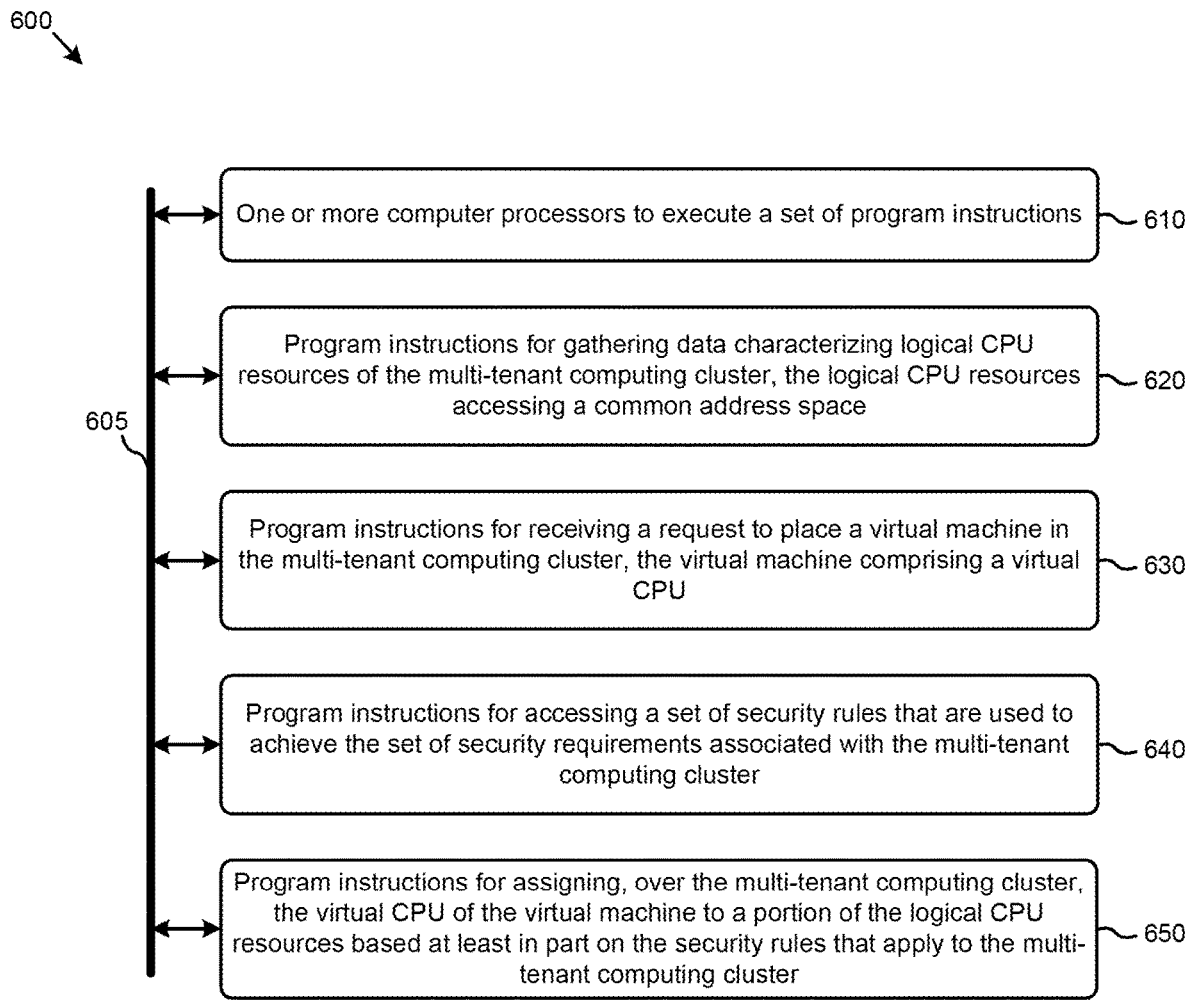
FIG. 6 depicts system components as arrangements of computing modules that are interconnected so as to implement certain of the herein-disclosed embodiments.

FIG. 6 depicts a system 600 as an arrangement of computing modules that are interconnected so as to operate cooperatively to implement certain of the herein-disclosed embodiments. This and other embodiments present particular arrangements of elements that, individually or as combined, serve to form improved technological processes that address security vulnerabilities when allocating virtual machines to logical CPU resources in a multi-tenant environment. The partitioning of system 600 is merely illustrative and other partitions are possible. As an option, the system 600 may be implemented in the context of the architecture and functionality of the embodiments described herein. Of course, however, the system 600 or any operation therein may be carried out in any desired environment. The system 600 comprises at least one processor and at least one memory, the memory serving to store program instructions corresponding to the operations of the system. As shown, an operation can be implemented in whole or in part using program instructions accessible by a module. The modules are connected to a communication path 605, and any operation can communicate with any other operations over communication path 605. The modules of the system can, individually or in combination, perform method operations within system 600. Any operations performed within system 600 may be performed in any order unless as may be specified in the claims. The shown embodiment implements a portion of a computer system, presented as system 600, comprising one or more computer processors to execute a set of program code instructions (module 610) and modules for accessing memory to hold program code instructions to perform: gathering data characterizing logical CPU resources of the multi-tenant computing cluster, the logical CPU resources accessing a common address space (module 620); receiving a request to place a virtual machine in the multi-tenant computing cluster, the virtual machine comprising a virtual CPU (module 630); accessing a set of security rules that are used to achieve the set of security requirements associated with the multi-tenant computing cluster (module 640); and assigning, over the multi-tenant computing cluster, the virtual CPU of the virtual machine to a portion of the logical CPU resources based at least in part on the security rules that apply to the multi-tenant computing cluster (module 650).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

Figure 7A:
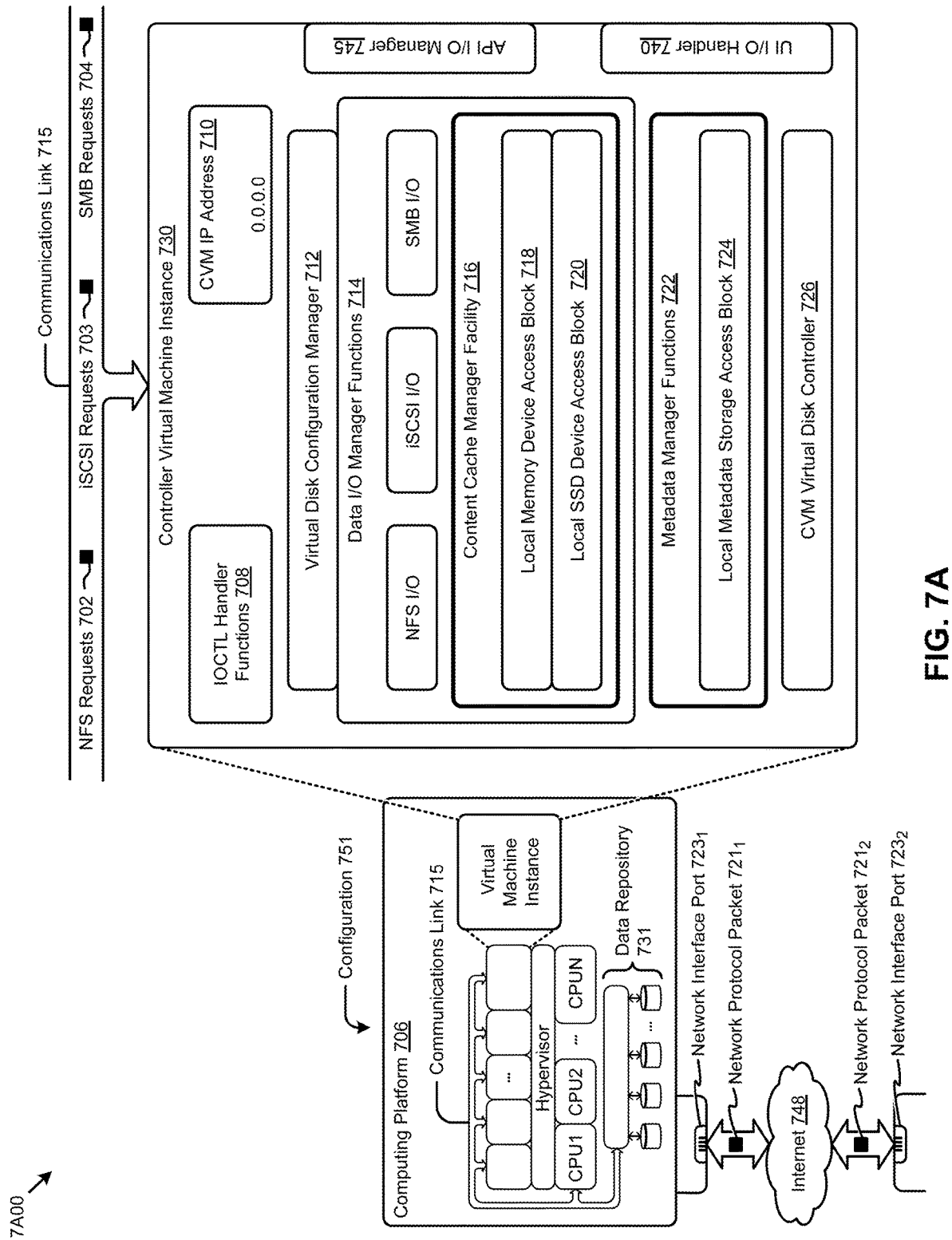
FIG. 7A, FIG. 7B, and FIG. 7C depict virtualized controller architectures comprising collections of interconnected components suitable for implementing embodiments of the present disclosure and/or for use in the herein-described environments.

FIG. 7A depicts a virtualized controller as implemented by the shown virtual machine architecture 7A00. The heretofore-disclosed embodiments, including variations of any virtualized controllers, can be implemented in distributed systems where a plurality of networked-connected devices communicate and coordinate actions using inter-component messaging. Distributed systems are systems of interconnected components that are designed for, or dedicated to, storage operations as well as being designed for, or dedicated to, computing and/or networking operations. Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port $723_1$ and network interface port $723_2$). Configuration 751 can be addressed through one or more network interface ports using an IP address. Any operational element within computing platform 706 can perform sending and receiving operations using any of a range of network protocols, possibly including network protocols that send and receive packets (e.g., network protocol packet $721_1$ and network protocol packet $721_2$).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to security-aware scheduling of virtual machines in a multi-tenant infrastructure. In some embodiments, a module may include one or more state machines and/or combinational logic used to implement or facilitate the operational and/or performance characteristics pertaining to security-aware scheduling of virtual machines in a multi-tenant infrastructure.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of security-aware scheduling of virtual machines in a multi-tenant infrastructure). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to security-aware scheduling of virtual machines in a multi-tenant infrastructure, and/or for improving the way data is manipulated when performing computerized operations pertaining to applying security rules to assign virtual machines to logical CPU resources in a multi-tenant computing environment.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT", issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT", issued on Oct. 1, 2013, which is hereby incorporated by reference in its entirety.

Figure 7B:
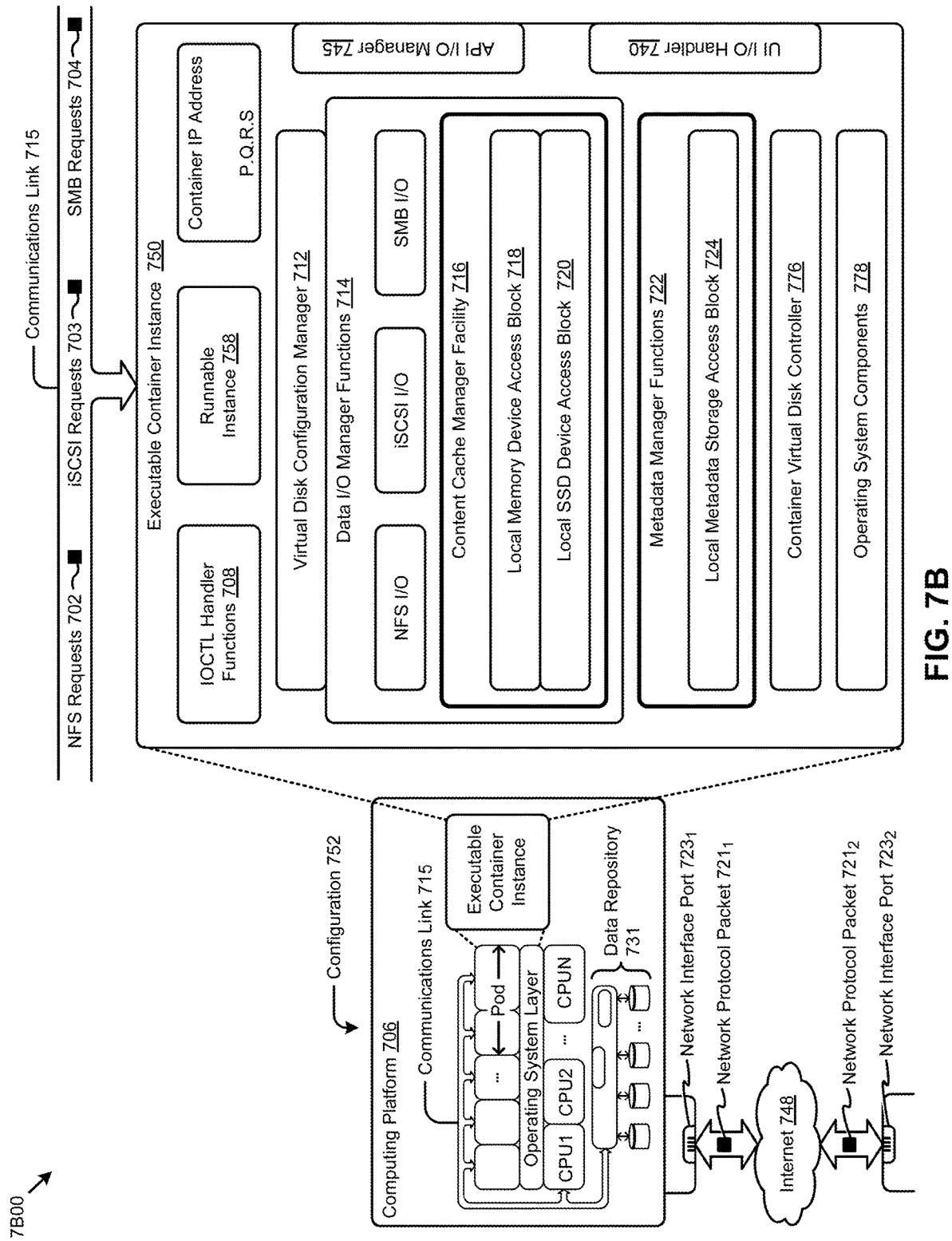

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance (e.g., a Docker container instance) can serve as an instance of an application container or as a controller executable container. Any executable container of any sort can be rooted in a directory system, and can be configured to be accessed by file system commands (e.g., "ls" or "ls-a", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
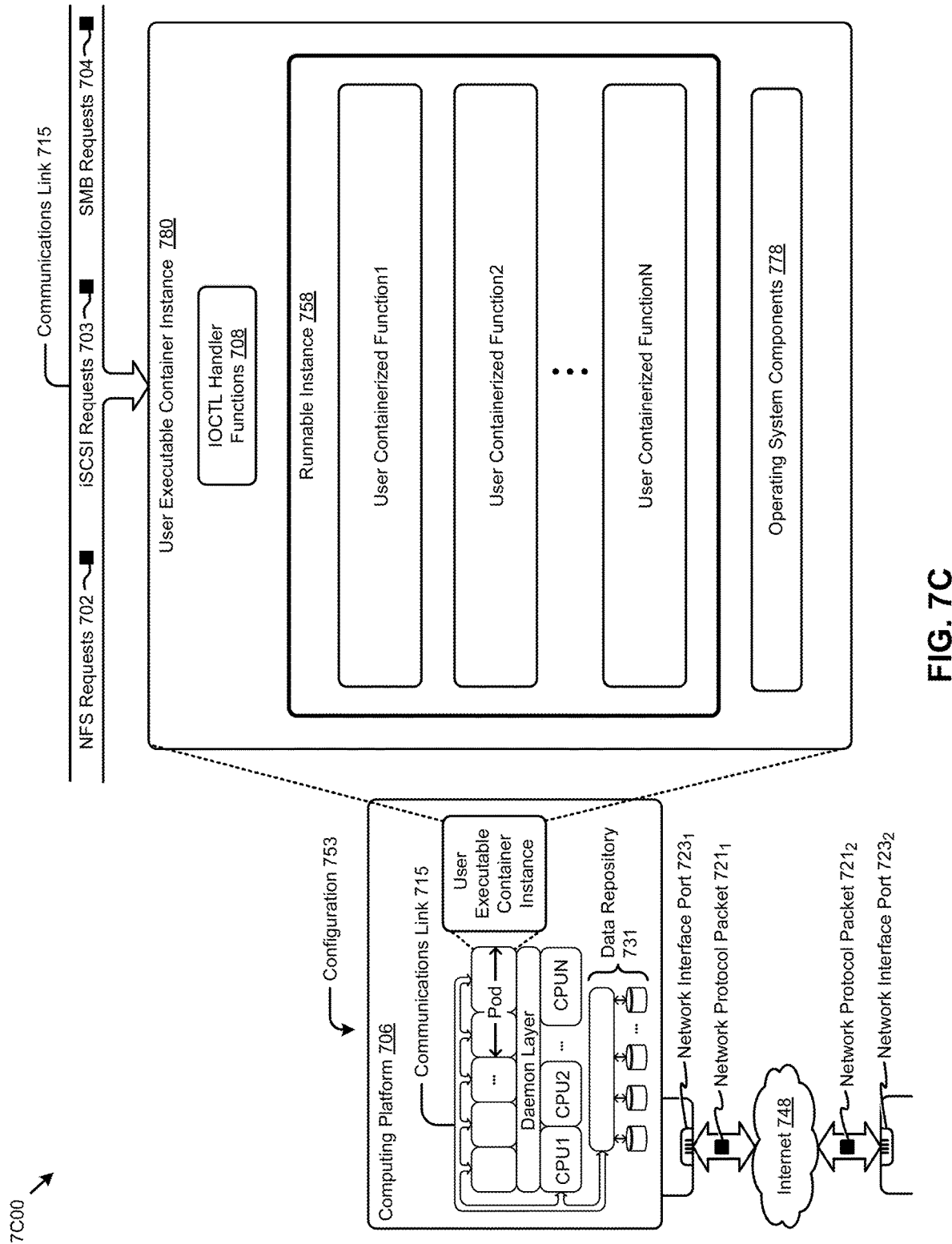

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 780. Configuration 753 includes a daemon layer (as shown) that performs certain functions of an operating system.

User executable container instance 780 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 780.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor causes the processor to perform acts comprising:
    gathering data characterizing resources of a computing cluster;
    receiving a request to place a virtual machine onto the resources of the computing cluster;
    identifying a target node from among nodes of the computing cluster based at least in part on a security rule corresponding to resource allocation to the virtual machine, wherein the security rule specifies an isolation requirement between tenants associated with allocation of a processor to the virtual machine; and
    assigning at least a portion of the processor of the identified target node to the virtual machine.

2. The non-transitory computer readable medium of claim 1, wherein identifying the target node from among nodes of the computing cluster based at least in part on the security rule comprises identifying a set of candidate nodes from among the nodes, the set of candidate nodes having a respective processor that is assignable to the virtual machine without violating the security rule and evaluating the set of candidate nodes based on processor headroom.

3. The non-transitory computer readable medium of claim 1, wherein the processor comprises a physical processor.

4. The non-transitory computer readable medium of claim 3, wherein the physical processor comprises two or more logical processors.

5. The non-transitory computer readable medium of claim 3, wherein the physical processor comprises two or more logical processing units.

6. The non-transitory computer readable medium of claim 1, wherein the processor comprises a physical processing unit having two or more logical processing units and the acts further comprise invoking a bin-packing algorithm to assign at least a portion of a logical processing unit of the physical processing unit to the virtual machine.

7. The non-transitory computer readable medium of claim 1, wherein the acts further comprise aligning an isolation group boundary of the processor.

8. The non-transitory computer readable medium of claim 7, wherein an isolation group associated with the processor comprises a single tenant of the computing cluster.

9. A method comprising:
    gathering data characterizing resources of a computing cluster;
    receiving a request to place a virtual machine onto the resources of the computing cluster;
    identifying a target node from among nodes of the computing cluster based at least in part on a security rule corresponding to resource allocation to the virtual machine, wherein the security rule specifies an isolation requirement between tenants associated with allocation of a processor to the virtual machine; and
    assigning at least a portion of the processor of the identified target node to the virtual machine.

10. The method of claim 9, wherein identifying the target node from among nodes of the computing cluster based at least in part on the security rule comprises identifying a set of candidate nodes from among the nodes, the set of candidate nodes having a respective processor that is assignable to the virtual machine without violating the security rule and evaluating the set of candidate nodes based on CPU headroom.

11. The method of claim 9, wherein the processor comprises a physical processor.

12. The method of claim 11, wherein the physical processor comprises two or more logical processors.

13. The method of claim 11, wherein the physical processor comprises two or more logical processing units.

14. The method of claim 9, wherein the processor comprises a physical processing unit having two or more logical processing units and further comprising invoking a bin-packing algorithm to assign at least a portion of a logical processing unit of the physical processing unit to the virtual machine.

15. The method of claim 9, further comprising aligning an isolation group boundary of the processor.

16. The method of claim 15, wherein an isolation group associated with the processor comprises a single tenant of the computing cluster.

17. A system comprising:
a storage medium having stored thereon a sequence of instructions; and
a processor that executes the sequence of instructions to cause the processor to perform acts comprising,
gathering data characterizing resources of a computing cluster;
receiving a request to place a virtual machine onto the resources of the computing cluster;
identifying a target node from among nodes of the computing cluster based at least in part on a security rule corresponding to resource allocation to the virtual machine, wherein the security rule specifies an isolation requirement between tenants associated with allocation of a processor to the virtual machine; and
assigning at least a portion of the processor of the identified target node to the virtual machine.

18. The system of claim 17, wherein identifying the target node from among nodes of the computing cluster based at least in part on the security rule comprises identifying a set of candidate nodes from among the nodes, the set of candidate nodes having a respective processor that is assignable to the virtual machine without violating the security rule and evaluating the set of candidate nodes based on processor headroom.

19. The system of claim 17, wherein the processor comprises a physical processor.

20. The system of claim 19, wherein the physical processor comprises two or more logical processors.

21. The system of claim 19, wherein the physical processor comprises two or more logical processing units.

22. The system of claim 17, wherein the processor comprises a physical processing unit having two or more logical processing units and the acts further comprise invoking a bin-packing algorithm to assign at least a portion of a logical processing unit of the physical processing unit to the virtual machine.

23. The system of claim 17, wherein the acts further comprise aligning an isolation group boundary of the processor.

24. The system of claim 23, wherein an isolation group associated with the processor comprises a single tenant of the computing cluster.

25. The system of claim 17, wherein the processor comprises a logical processor.

26. The system of claim 17, wherein the processor comprises a physical processor or a logical processor that is allocated to a single tenant based on at least the security rule.

27. The method of claim 9, wherein the processor comprises a logical processor.

28. The method of claim 9, wherein the processor comprises a physical processor or a logical processor that is allocated to a single tenant based on at least the security rule.

29. The non-transitory computer readable medium of claim 1, wherein the processor comprises a logical processor.

30. The non-transitory computer readable medium of claim 1, wherein the processor comprises a physical processor or a logical processor that is allocated to a single tenant based on at least the security rule.

* * * * *